United States Patent [19]

Inoue et al.

[11] Patent Number: 5,367,009
[45] Date of Patent: Nov. 22, 1994

[54] AQUEOUS ROSIN EMULSION AND DISPERSANT COMPOSITION USEFUL THEREIN

[75] Inventors: Tetsuya Inoue; Yoshihiro Sasaki; Hirofumi Yoshimura, all of Osaka, Japan

[73] Assignee: Arakawa Chemical Industries Ltd., Osaka, Japan

[21] Appl. No.: 778,076

[22] PCT Filed: Apr. 8, 1991

[86] PCT No.: PCT/JP91/00460

§ 371 Date: Dec. 9, 1991

§ 102(e) Date: Dec. 9, 1991

[87] PCT Pub. No.: WO91/16128

PCT Pub. Date: Oct. 31, 1991

[30] Foreign Application Priority Data

Apr. 12, 1990 [JP] Japan .................... 2-98033

[51] Int. Cl.$^5$ .......... C08J 3/21; C08L 93/00; B01F 17/18; B01J 13/00
[52] U.S. Cl. .................... 524/272; 106/236; 106/238; 162/180; 252/311; 252/312; 252/314; 252/356; 252/357
[58] Field of Search .......... 252/311, 312, 356, 357; 106/236, 238; 162/180; 524/77, 272, 274

[56] References Cited

U.S. PATENT DOCUMENTS

| | | | |
|---|---|---|---|
| 3,385,839 | 5/1968 | Honig et al. | 526/304 |
| 4,522,686 | 6/1985 | Dumas | 106/238 X |
| 4,770,743 | 9/1988 | Weberndoerfer et al. | 252/311 X |
| 4,806,591 | 2/1989 | Probst et al. | 524/820 |
| 4,839,414 | 6/1989 | Bederke et al. | 524/507 |
| 4,943,608 | 7/1990 | Takahashi et al. | 524/272 |
| 5,006,621 | 4/1991 | Wahle et al. | 526/252 |

FOREIGN PATENT DOCUMENTS

| | | |
|---|---|---|
| 0016623 | 10/1980 | European Pat. Off. . |
| 0221400 | 5/1987 | European Pat. Off. . |
| 0334155 | 9/1989 | European Pat. Off. . |
| 0350834 | 1/1990 | European Pat. Off. . |
| 3628123 | 2/1988 | Germany . |
| 53-27649 | 3/1978 | Japan . |
| 56-26096 | 3/1981 | Japan . |
| 63-120198 | 5/1988 | Japan . |
| 64-3994 | 1/1989 | Japan . |
| 2-33393 | 2/1990 | Japan . |

Primary Examiner—Richard D. Lovering
Attorney, Agent, or Firm—Armstrong, Westerman, Hattori, McLeland & Naughton

[57] ABSTRACT

This invention provides a dispersing agent suitable for the production of an aqueous rosin emulsion which contains as an active ingredient a copolymer salt containing a certain oxyalkylene-containing monomer unit and a tertiary and/or quaternary nitrogen-containing monomer unit and a dispersing agent suited to the production of aqueous rosin emulsions which contains at least one member of units of quaternary nitrogen-containing monomer having a hydroxyl group, units of quaternary nitrogen-containing monomer having a vinylbenzyl group and units of quaternary nitrogen-containing monomer having a maleimide group and at least one member of hydrocarbon monomer units and (meth-)acrylate ester monomer units.

The invention further provides an aqueous rosin emulsion as prepared using the above dispersing agent and a sizing agent containing the emulsion as an active ingredient.

17 Claims, No Drawings

AQUEOUS ROSIN EMULSION AND DISPERSANT COMPOSITION USEFUL THEREIN

TECHNICAL FIELD

The present invention relates to a dispersant composition containing a defined polymer, which is suitable for the production of aqueous rosin emulsion, and an aqueous rosin emulsion containing said dispersant composition. The invention further relates to an emulsion size containing said aqueous rosin emulsion as an active ingredient.

BACKGROUND ART

Rosins have heretofore been employed in a diversity of applications including, inter alia, paper size, tackifier, rubber emulsifier, coatings, printing ink and so on. Recently, from the standpoints of safety and environmental protection, much attention has been focused on the technology of providing rosins in aqueous emulsion forms. Particularly in the field of sizing agents, improvements have been sought in aqueous rosin emulsions.

Cellulosic fiber products such as paper, cardboard, wood fiber board, etc. are generally manufactured in web-forming systems using size-containing aqueous dispersions of cellulosic fibers, and with regard to the sizing agents used for this purpose, saponified and fortified rosin sizes are commonly employed because they impart water resistance, resistance to bleeding, etc. to final sheets. However, such fortified rosin sizes cannot be properly used in high-temperature web-making processes. The recent rigorous control over effluent disposal calls for a closed papermaking system but the resulting increase in the temperature of papermaking water detracts from the effect of sizes. In the case of neutral paper which is lean in alum, i.e. aluminum sulfate, too, the effect of sizes is inadequate.

Therefore, in recent years, as substitutes for such fortified rosin sizes, rosin emulsion sizes which resolve many of the above problems have been used in preponderance in this field. Several methods are known for the production of such emulsion sizes. They include the method which comprises dispersing a fortified rosin in water in the presence of a suitable dispersing agent using a high-pressure shear homogenizer, the method in which a molten fortified rosin is subjected to phase inversion using a suitable dispersing agent and water, and the method comprising dissolving a fortified rosin in a solvent and emulsifying the solution with a dispersing agent and water. Among the dispersing agents which are generally used in the production of such emulsion sizes are sodium alkylsulfate, sodium alkylbenzenesulfonate, polyoxyethylene alkylphenyl ether, polyoxyethylene alkylphenyl ether sulfate, etc. However, emulsion sizes prepared with these known dispersing agents, which are invariably of low molecular weight, have the drawback of producing a copious foam in the process of web formation, although in sizing effect they are superior to said saponified and fortified rosin sizes. Moreover, these emulsion sizes are not satisfactory enough in sizing effect in high-temperature or high-pH systems.

More recently, much research and development work has been undertaken in the field of rosin emulsion sizes employing polymeric dispersing agents (Examined Japanese Patent Publication No. 48031/1984 and Unexamined Japanese Patent Publications No. 169898/1981 and No. 108796/1986). Rosin emulsion sizes obtainable with such polymeric dispersing agents are satisfactory in that they produce no appreciable foam but are still deficient in sizing effect in a high-temperature or high-pH web formation system.

BRIEF SUMMARY OF THE INVENTION

It is an object of the invention to provide a dispersant composition for use in the production of an aqueous rosin emulsion, an aqueous rosin emulsion containing said dispersant composition, and an emulsion size containing said aqueous rosin emulsion as an active ingredient, all overcoming the disadvantages of the prior art technologies mentioned hereinbefore.

It is another object of the invention to provide a rosin emulsion size which can be effective over a broad pH range, does not suffer a decrease in sizing performance even in high-temperature web-forming systems, and features a low foam profile and an improved ease of handling.

These and other objects of the invention will become apparent as the following description proceeds.

In accordance with the present invention, there are provided dispersant compositions, shown below under (i) through (iv), for use in the production of aqueous rosin emulsions.

(i) A dispersant composition suitable for the production of an aqueous rosin emulsion (hereinafter referred to as dispersant composition i) which contains as an active ingredient a water-soluble copolymer salt comprising (1) a monomer unit a of the general formula

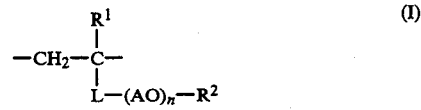

wherein $R^1$ means a hydrogen atom or a methyl group; L means —COO— or —$CH_2O$—; A means an alkylene group of 2 to 4 carbon atoms; n means a whole number of not less than 1; and $R^2$ means a hydrogen atom, an alkyl group of 1 to 24 carbon atoms or an aralkyl group and (2) a monomer unit b containing a tertiary and/or quaternary nitrogen atom.

(ii) A dispersant composition suitable for the production of an aqueous rosin emulsion (hereinafter referred to as dispersant composition ii) which contains as an active ingredient a water-soluble copolymer salt comprising (1) a monomer unit a of the general formula

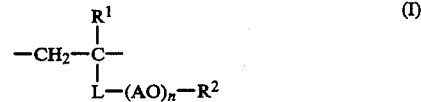

wherein $R^1$ means a hydrogen atom or a methyl group; L means —COO— or —$CH_2O$—; A means an alkylene group of 2 to 4 carbon atoms; n means a whole number of not less than 1; and $R^2$ means a hydrogen atom, an alkyl group of 1 to 24 carbon atoms or an aralkyl group and (2) a monomer unit b containing a tertiary and/or quaternary nitrogen atom, and (3) a monomer unit c which is copolymerizable with said monomer units a and b.

(iii) A dispersant composition suitable for the production of an aqueous rosin emulsion (hereinafter referred to as dispersant composition iii) which contains as an active ingredient a water-soluble copolymer salt comprising (4) at least one monomer unit d selected from the group consisting of units of quaternary nitrogen-containing monomer having a hydroxyl group, units of quaternary nitrogen-containing monomer having a vinylbenzyl group and units of quaternary nitrogen-containing monomer having a maleimide group and (5) at least one monomer unit e selected from the group consisting of a hydrocarbon monomer unit and a (meth)acrylate ester monomer unit.

(iv) A dispersant composition suitable for the production of an aqueous rosin emulsion (hereinafter referred to as dispersant composition iv) which contains as an active ingredient a water-soluble copolymer salt comprising (4) at least one monomer unit d selected from the group consisting of units of quaternary nitrogen-containing monomer having a hydroxyl group, units of quaternary nitrogen-containing monomer having a vinylbenzyl group and units of quaternary nitrogen-containing monomer having a maleimide group, (5) at least one monomer unit e selected from the group consisting of a hydrocarbon monomer unit and a (meth)acrylate ester monomer unit, and (6) a monomer unit f which is copolymerizable with said monomer units d and e.

The invention further provides an aqueous rosin emulsion containing 1 to 30 parts by weight of any of said dispersant compositions i through iv per 100 parts by weight of rosin and an emulsion size containing said aqueous rosin emulsion as an active ingredient.

DETAILED DESCRIPTION OF THE PREFERRED EMBODIMENTS

The inventor of the present invention conducted intensive investigations to overcome the above-mentioned disadvantages of the prior art with particular attention to the dispersing agent for rosins and found that when a rosin is dispersed in water with the aid of a water-soluble copolymer salt containing a defined cationic monomer unit as a constituent, there is produced a papermaking emulsion size which has a low foaming potential and displays excellent sizing characteristics even in web-forming systems varying in pH over a broad range.

The present invention has been developed on the basis of the above finding.

As mentioned above, the dispersant composition i of the invention is a water-soluble copolymer salt comprising said monomer unit a and monomer unit b. The monomer unit a can be expressed by the following general formula.

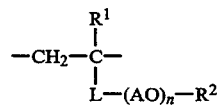

wherein $R^1$ means a hydrogen atom or a methyl group; L means —COO— or —CH$_2$O—; A means an alkylene group of 2 to 4 carbon atoms; n means a whole number of not less than 1; and $R^2$ means a hydrogen atom, an alkyl group of 1 to 24 carbon atoms or an aralkyl group.

The alkylene group of 2 to 4 carbon atoms as designated by A in the above formula includes ethylene, propylene, butylene, etc., and this alkylene group taken together with the adjacent oxygen atom forms an oxyalkylene group. From the standpoint of emulsifiability or dispersability, the degree of polymerization n of this oxyalkylene is a whole number of not less than 1, preferably a whole number between 1 and 30, and for still better results, a whole number between 1 and 20. The oxyalkylene group may be one kind of oxyalkylene or may be a combination of different kinds of oxyalkylene groups arranged in alternating sequence or random sequence. Preferred is one involving oxypropylene alone or the combination of oxyethylene and oxypropylene, and the former is the most desirable.

$R^2$ means a hydrogen atom, an alkyl group of 1 to 24 carbon atoms or an aralkyl group, and the $C_{1-24}$ alkyl group includes methyl, ethyl, propyl, butyl, octyl, dodecyl, stearyl, etc., while the aralkyl group may for example be benzyl. Particularly preferred is a hydrogen atom or a methyl group, and a hydrogen atom is the most desirable.

The monomer unit b can be virtually any monomer unit containing a tertiary nitrogen and/or a quaternary nitrogen atom and is selected from the group consisting of tertiary nitrogen-containing monomer units of the general formula

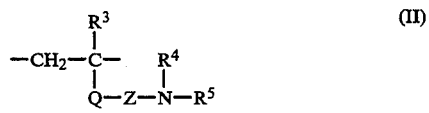

wherein $R^3$ means a hydrogen atom or a methyl group; Q means —COO—, —CONH— or —CH$_2$—; $R^4$ means an alkyl group of 1 to 4 carbon atoms or an aralkyl group; $R^5$ means an alkyl group of 1 to 4 carbon atoms, an aralkyl group or a group of the general formula

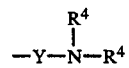

(III), where Y is an alkylene group of 1 to 4 carbon atoms or a hydroxyalkylene group of 2 to 4 carbon atoms; $R^4$ is as defined hereabove; Z means an alkylene group of 1 to 4 carbon atoms, a hydroxyalkylene group of 2 to 4 carbon atoms or a phenylene group, units of tertiary nitrogen-containing monomer having a vinylbenzyl group, units of tertiary nitrogen-containing monomer having a maleimide group, and monomer units of quaternarizate of these tertiary nitrogen-containing monomers.

The alkyl group of 1 to 4 carbon atoms as designated by $R^4$, $R^5$ in general formula (II) or by $R^4$ in general formula (III) may, for example, be methyl, ethyl, n- or iso-propyl or n- or iso-butyl. The aralkyl group may for example be benzyl. Preferred is methyl.

The alkylene group of 1 to 4 carbon atoms as designated by Z and Y includes methylene, ethylene, n-or iso-propylene, n- or iso-butylene and so on. The hydroxyalkylene group of 2 to 4 carbon atoms includes 2-hydroxyethylene, 2-hydroxylpropylene and so on. Preferred is ethylene, n-propylene or 2-hydroxypropylene.

The following monomers can be mentioned as monomers providing tertiary nitrogen-containing monomer units of general formula (II).

For example, they are:

Tertiary nitrogen-containing (meth)acrylates [the term '(meth)acrylate' stands for acrylate and/or methacrylate; the same applies hereinafter]: dialkylamino(hydroxy)alkyl (meth)acrylates, e.g. 2-dimethylaminoethyl (meth)acrylate, 2-diethylaminoethyl (meth)acrylate, 3-dimethylamino-2-hydroxypropyl (meth)acrylate, 3-diethylamino-2-hydroxypropyl (meth)acrylate, 3-(N',N'-dimethylamino-N-methylamino)-2-hydroxypropyl (meth)acrylate, etc.;

Tertiary nitrogen-containing (meth)acrylamides: dialkylamino(hydroxy) alkyl (meth)acrylamides, e.g. 2-dimethylaminoethyl (meth)acrylamide, 2-diethylaminoethyl (meth)acrylamide, 3-dimethylamino-2-hydroxypropyl (meth)acrylamide, 3-diethylamino-2-hydroxypropyl (meth)acrylamide, etc.;

Tertiary nitrogen-containing (meth)allylethers: e.g. 3-allyloxy-2-hydroxypropyldimethylamine, etc.

Among such tertiary nitrogen-containing monomers of general formula (II), tertiary nitrogen-containing (meth)acrylates are preferred and 2-dimethylaminoethyl (meth)acrylate and 3-diethylamino-2-hydroxypropyl (meth)acrylate are particularly desirable.

Among the tertiary nitrogen-containing monomers each having a vinylbenzyl group are vinylbenzyldimethylamine and 4-(vinylbenzyl)morpholine.

Among the tertiary nitrogen-containing monomers each having a maleimide group is N-[N',N'-dimethyl-N'-(2,3-epoxypropyl-aminopropyl]maleimide.

Aside from the foregoing, diallyldimethylamine can also be reckoned among said tertiary nitrogen-containing monomers, while glycidyldimethylamine maleate, 3-chloro-2-hydroxypropyldimethylamine fumarate, glycidyldimethylamine itaconate and maleic acid alkyl ($C_{1-24}$) hemiester glycidyldimethylamine salt can be reckoned among said tertiary nitrogen-containing monomers each having a hydroxyl group.

The tertiary nitrogen-containing monomer unit mentioned above can be converted to a monomer unit containing a tertiary water-soluble salt using a mineral acid or an organic acid. The mineral acid mentioned just above includes hydrogen halides, sulfuric acid, nitric acid, phosphoric acid, carbonic acid, etc. and the organic acid includes acetic acid, p-toluenesulfonic acid, alkyl sulfuric acids and so on. The above monomer unit can also be converted to a monomer unit containing a quaternary water-soluble salt using a quaternizing agent. The quaternizing agent includes, among others, epihalohydrins, alkyl halides, benzyl halides, dialkyl sulfates, lactones and so on. It should, of course, be understood that the above production of a tertiary salt as well as the above quaternization reaction can be applied not only to the monomer but also to the copolymer to give the corresponding water-soluble salt. Moreover, an unsaturated carboxylic acid such as (meth)acrylic acid or maleic acid or (meth)acrylamide may be first copolymerized and the resulting copolymer be converted to a water-soluble salt using an epoxy-containing quaternizing agent such as glycidyltrimethylammonium chloride.

Regarding the proportions of said tertiary nitrogen-containing monomer and said quaternary nitrogen-containing monomer in the monomer unit b, the proportion of the quaternary nitrogen-containing monomer is generally 20 to 100 weight %, preferably 40 to 100 weight % and more desirably 70 to 100 weight %. When the proportion is less than 20 weight %, both emulsifiability and the stability of the emulsion tend-to be sacrificed.

The proportion of said monomer unit a in the whole dispersant composition i is generally 20 to 80 weight %, preferably 30 to 70 weight % and more desirably 30 to 60 weight %. When the proportion is less than 20 weight %, emulsifiability is adversely affected. When it is over 80 weight %, the stability of the emulsion is sacrificed. The proportion of monomer unit b is generally 20 to 80 weight %, preferably 30 to 70 weight % and more desirably 30 to 60 weight %. When the proportion is less than 20 weight %, the stability of the emulsion is adversely affected. When the proportion is over 80 weight %, emulsifiability is adversely affected.

The dispersant composition ii is a water-soluble copolymer salt comprising said monomer units a and b plus a monomer unit c which is copolymerizable with a and b. This monomer unit c includes, among others, aromatic hydrocarbon series vinyl monomers such as styrenes, e.g. styrene, α-methylstyrene, vinyltoluene, etc., vinylnaphthalenes, halogenated styrenes such as dichlorostyrene etc.; aliphatic hydrocarbon series vinyl monomers such as ethylene, propylene, butene, isobutylene, pentene, heptene, diisobutylene, octene, dodecene, octadecene, butadiene, isoprene, etc.; alicyclic hydrocarbon series vinyl monomers such as cyclopentadiene, pinene, limonene, indene, bicyclopentadiene, ethylidenenorbornene, etc.; alkyl (meth)acrylate monomers ($C_{1-24}$ alkyl esters) such as methyl (meth)acrylate, ethyl (meth)acrylate, butyl (meth)acrylate, 2-ethylhexyl (meth)acrylate, dodecyl (meth)acrylate, hexadecyl (meth)acrylate, heptadecyl (meth)acrylate, eicosyl (meth)acrylate, etc.; amide-containing monomers such as (meth)acrylamide, N-methylol (meth)acrylamide, etc.; hydroxy-containing monomers such as hydroxyethyl (meth)acrylate etc.; vinyl ester monomers such as vinyl acetate etc.; nitrile-containing monomers such as (meth)acrylonitrile and so on. Among these monomers, hydrocarbon monomers and (meth)acrylate esters are preferred and styrene and butyl (meth)acrylate are more desirable.

The relative amounts of monomer unit a and monomer unit b in dispersant composition ii may be similar to those in dispersant composition i and the proportion of monomer unit c is not more than 50 weight % and preferably 1 to 30 weight %. When the proportion of c exceeds 50 weight %, both emulsifiability and the stability of the emulsion tend to be adversely affected.

The dispersant composition iii is a water-soluble copolymer salt comprising a monomer unit d and a monomer unit e. The monomer unit d is a quaternary nitrogen-containing monomer unit having a hydroxyl group and may, for example, be a monomer unit of the general formula

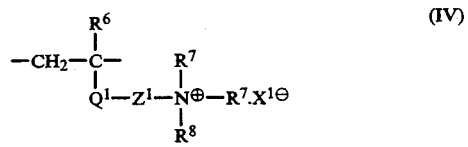

(IV)

wherein $R^6$ means a hydrogen atom or a methyl group; $Q^1$ means —COO—, —CONH— or $CH_2O$—; $R^7$ means an alkyl group of 1 to 4 carbon atoms or an aralkyl group; $R^8$ means an alkyl group of 1 to 4 carbon atoms, an aralkyl group or a group of the general formula

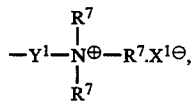

(V)

wherein $y^1$ means an alkylene group of 1 to 4 carbon atoms or a hydroxyalkylene group of 2 to 4 carbon atoms; $R^7$ is as defined hereinbefore; and $X^{1\ominus}$ means a salt-forming anion; $Z^1$ means an alkylene group of 1 to 4 carbon atoms, a hydroxyalkylene group of 2 to 4 carbon atoms or a phenylene group; $X^{1\ominus}$ is as defined hereinbefore; provided, however, that at least either $Y^1$ or $Z^1$ means a hydroxyalkylene group of 2 to 4 carbon atoms.

The monomer unit of general formula (IV) may be any of the hydroxyl-containing monomer salts among the quaternary salts of monomer units of general formula (II) which were mentioned for monomer unit b hereinbefore.

Aside from the forgoing, the quaternary ammonium salt of maleic acid which is obtainable using glycidyltrimethylammonium chloride, the quaternary salt of fumaric acid which is obtainable using 3-chloro-2-hydroxypropyltrimethylammonium chloride, the quaternary salt of itaconic acid which is obtainable using glycidyltrimethylammonium bromide and the quaternary salt of a maleic acid alkyl ($C_{1-24}$) hemiester as obtainable using glycidyltrimethylammonium chloride may be mentioned by way of example.

The monomer unit e includes, among others, hydrocarbon monomer units and (meth)acrylate ester monomer units mentioned for monomer unit c.

The proportion of monomer unit d in dispersant composition iii is generally 20 to 80 weight %, preferably 30 to 70 weight % and more desirably 40 to 60 weight %. When the proportion is less than 20 weight % or more than 80%, emulsifiability is adversely affected. The proportion of monomer unit e is generally 20 to 80 weight %, preferably 30 to 70 weight % and more desirably 30 to 60 weight %. When the proportion is less than 20 weight % or more than 80 weight %, emulsifiability is adversely affected.

The dispersant composition iv is a water-soluble copolymer salt comprising said monomer unit d and monomer unit e plus a monomer unit f which is copolymerizable with d and e. The monomer unit f includes, among others, said monomer unit a, the tertiary nitrogen-containing monomers and hydroxy-free quaternary nitrogen-containing monomers among the monomers mentioned for said monomer unit b, and the amide-containing monomers, hydroxy-containing monomers, vinyl ester monomers and nitrile-containing monomers mentioned for monomer unit c. Preferred is the monomer unit a.

The relative amounts of monomer unit d and monomer unit e in dispersant composition iv may be similar to those in dispersant composition iii and the proportion of monomer unit f is preferably not more than 20 weight %. When the proportion of f exceeds 20 weight %, emulsifiability tends to be sacrificed.

The above dispersant composition i, ii, iii and iv comprising copolymer salts can be easily provided by reactions for copolymerization of the above monomers using various known procedures. Among such procedures are solution polymerization, emulsion polymerization and suspension polymerization. The solution polymerization reaction can be conducted using a suitable solvent such as toluene, isopropyl alcohol, methyl isobutyl ketone or the like. The emulsifying agent that can be used in such emulsion polymerization is not critical in kind but a variety of surfactants can be selectively employed. Thus, there may be employed various anionic surfactants such as dialkyl sulfosuccinate salts, alkanesulfonic acid salts, α-olefinsulfonic acid salts, polyoxyethylene alkyl ether sulfosuccinate salts, polyoxyethylene styryl phenyl ether sulfosuccinate salts, naphthalenesulfonic acidformaldehyde condensate, polyoxyethylene alkyl ether sulfate salts, polyoxyethylene alkylphenyl ether sulfate salts, etc. and various nonionic surfactants such as polyoxyethylene alkyl ethers, polyoxyethylene styryl phenyl ether, polyoxyethylene sorbitan fatty acid esters and so on. These surfactants may be used alone or in combination. The proportion of such surfactant or surfactants is generally about 0.1 to 10 weight % based on the total monomer charge.

There is no particular limitation on the type of polymerization initiator that can be used in such polymerization reactions. Thus, there can be employed various water-soluble initiators, for example redox initiators each comprising an oxidizing agent such as a persulfate, e.g. sodium persulfate, ammonium persulfate, etc., hydrogen peroxide or the like in combination with a reducing agent such as sulfurous acid salts, rongalit or the like, as well as oil-soluble initiators such as peroxides, e.g. benzoyl peroxide, lauroyl peroxide, etc., an azo compound such as azoisobutyronitrile etc. and so on. The proportion of such polymerization initiator is 0.1 to 20 weight % based on the total monomer charge.

For adjusting the molecular weight range of the resulting copolymer, the polymerization reaction may be conducted in the presence of an appropriate chain transfer agent, such as carbon tetrachloride, ethylbenzene, isopropylbenzene, cumene, thioglycolic acid esters, alkylmercaptans and 2,4-diphenyl-4-methyl-1-pentene, all of which are known. The proportion of such chain transfer agent is generally not more than 20 weight % based on the total monomer charge.

The reaction conditions are not particularly critical. Thus, generally the polymerization can be carried out at 200° C. under atmospheric or increased pressure.

The molecular weight of said copolymer is directly correlated with rosin-dispersing action, and is generally about 1000 to 500000 and preferably 1000 to 100000 as weight average molecular weight.

The dispersing agents of the invention, which are water-soluble copolymer salts, can be used in combination with surfactants of low molecular weight. Among the surfactants of low molecular weight are such cationic surfactants as cetyltrimethylammonium chloride and such nonionic surfactants as polyoxyethylene nonylphenyl ether and so on. However, the proportion of the water-soluble copolymer salt of the invention is generally not less than 50 weight % and preferably not less than 80 weight %.

Any of the dispersing agents of the invention, which are a water-soluble copolymer salt as mentioned above, can be used advantageously in the production of aqueous rosin emulsions.

The rosin to be dispersed in accordance with the invention is generally a composition comprising 0 to 95 weight % of rosin and 5 to 100 weight % of some rosin derivative, with or without a maximum of 50 weight % of a diluent for fortified rosin which may be added depending on the intended application.

The rosin mentioned above includes, among others, gum rosins, wood rosins, tall oil rosin, etc. and modification products thereof, and these can be used alone or in combination. The rosin derivative mentioned above includes, among others, hydrogenated rosins, disproportionated rosins, polymerized rosins, aldehyde-modified resins, fortified rosins, rosin esters and fortified rosin esters.

The diluent for rosin derivatives which can be included in the material rosin according to specific uses includes a variety of waxes such as paraffin wax, microcrystalline wax, etc. and hydrocarbon resins, such as petroleum resin, terpene resin, etc. as well as hydrogenation products thereof. The material rosin composition containing any of these diluents preferably contains at least 25 weight % of fortified rosin.

For the production of an aqueous rosin emulsion using the copolymer obtained as described above, there may be utilized any of the known production processes such as those described in Examined Japanese Patent Publication No. 4866/1978 (high-pressure melt emulsification process), Examined Japanese Patent Publication No. 22090/1978 (high-pressure solvent emulsification process), and Unexamined Japanese Patent Publication No. 77206/1977 and Examined Japanese Patent Publication No. 4938/1983 (phase inversion emulsification process).

Such a high-pressure solvent emulsification process, for instance, may comprise adding the dispersing agent copolymer described above and water, as well as a basic reagent such as sodium hydroxide, potassium hydroxide, ammonia or a lower amine where necessary, to a solution of the material rosin in a water-immiscible organic solvent, emulsifying the mixture by means of a homogenizer, a high-pressure piston emulsifier, an ultrasonic emulsifier or the like and finally removing said organic solvent by distillation. The timing of addition of the copolymer is not critical and irrespective of whether the copolymer is added just downstreams of the emulsifying machinery or after distillative removal of the solvent, there is obtained a satisfactory aqueous emulsion.

A phase inversion emulsification process can be practiced, for example as follows. First, the material rosin is stirred under heating at a temperature of, for example, 90° to 160° C. to prepare a rosin melt. While this rosin melt is stirred, the copolymer or an aqueous solution thereof and a predetermined quantity of hot water are added for phase inversion to thereby give an emulsion in which the rosin is a continuous phase while water constitutes a dispersoid.

In conducting the above-mentioned high-pressure solvent emulsification or phase inversion emulsification process, the dispersing agent copolymer is used in a proportion of, on a dry weight basis, 1 to 30 weight %, preferably 2 to 20 weight % based on the material rosin. When the proportion is less than 1 weight %, no adequate dispersing effect may be obtained. It is not economically sound, either, to use more than 30 weight %. If desired, the emulsion so obtained may be appropriately diluted with water or alkalinized water, or its pH may be similarly adjusted.

In conducting the above high-pressure solvent emulsification or phase inversion emulsification process, a surfactant, in addition to the copolymer, may be added in an amount not adversely affecting the foamless property or sizing effect of the copolymer. The surfactant for this purpose may be the one used in the emulsion polymerization reaction giving rise to the copolymer.

The resulting aqueous rosin emulsion contains generally 10 to 70 weight %, preferably 30 to 55 weight %, of nonvolatile matter and has the rosin dispersed uniformly therein as particles not larger than 1 $\mu$m and mostly less than 0.5 $\mu$m. Moreover, the aqueous emulsion of the invention is milky white in appearance and has a pH value in the range of 3.0 to 6.5.

The aqueous emulsion of the invention is stable at room temperature for at least six months, without forming precipitates. Moreover, this emulsion is so well dilutable that it can be diluted at a high factor with river water, tap water or well water and be dispersed uniformly in an aqueous dispersion of pulp. Moreover, such dilutions remain stable over a long period of time. Furthermore, the emulsion is high in mechanical stability and very low in foaming potential as will be apparent from the examples given hereinafter.

To use the aqueous emulsion of the invention as an emulsion size, it can be added, together with a retention aid or fixative such as aluminum sulfate, to an aqueous dispersion of pulp and the resulting mixture be formed into a web at pH 4 to 8. Alternatively, the aqueous emulsion is added, together with a cationic retention aid, to an aqueous dispersion of pulp and the resulting mixture is formed into a web at pH 4 to 8. Thus, the emulsion of the invention imparts an excellent sizing effect to the product paper over a broad range of papermaking pH. In these processes, the emulsion size of the invention is used in a proportion of about 0.05 to 3 weight % based on the pulp (dry weight basis). Since the size of the invention acts as a high binding affinity for pulp, the aluminum sulfate load can be decreased. Furthermore, the sizing effect is well preserved even if the temperature of papermaking system is higher, the hardness of water is increased or the proportion of impurity is increased as the result of adoption of a closed system for recycle of waste paper.

The aqueous emulsion of the invention can be applied not only to the formation of cellulosic webs but also to the formation of composite webs consisting of such cellulosic fiber and mineral fiber such as asbestos fiber, rock wool, etc. and/or synthetic fiber such as polyamide, polyester, polyolefin and other fibers for the manufacture of paper, cardboard, fiber board and other sheet products.

The aqueous emulsion provided in accordance with the invention can be utilized as an external or surface size, too, in which case it can be applied to the wet web by any of the conventional methods such as spraying, dipping, coating and so on.

Among the various aqueous emulsions of the invention, aqueous emulsions of rosin esters or fortified rosin esters can be effectively employed as tackifiers.

The papermaking rosin emulsion size according to the invention is excellent in mechanical stability and low in foam profile so that it contributes much to improved papermaking workability. Moreover, since it insures a sufficient sizing effect even in high-temperature or high-pH systems, this rosin size is sufficiently compatible with the recent closed systems for papermaking. Furthermore, the papermaking rosin emulsion size of the invention can of course be utilized as a surface size.

BEST MODE OF WORKING THE INVENTION

The following examples, comparative examples, reference examples and field test examples are all intended to illustrate the invention in further detail. The reference examples are illustrative of the procedures for production of the rosin to be used in the working of the invention. Unless otherwise indicated, all parts and % are by weight.

EXAMPLE 1

Forty-five parts of polyoxypropylene(n=9) methacrylate, 55 parts of 3-methacryloyloxy-2-hydroxypropyltrimethylammonium chloride, 30 parts of water-, 250 parts of isopropyl alcohol and 3 parts of azobisisobutyronitrile were mixed and subjected to react with stirring at 80° C. for 5 hours. The isopropyl alcohol was then removed and a sufficient quantity of water was added to make a nonvolatile content of 25 weight %, whereby a copolymer ammonium chloride having a weight average molecular weight of 10000 was obtained. This product corresponds to the dispersant composition i of the invention.

EXAMPLES 2 THROUGH 11

Copolymer salts were prepared in the same manner as Example 1 except that the monomer composition was varied as shown in Tables 1 and 2.

TABLE 1

| Example | Copolymer salt (composition, wt. %) | Molecular weight | Dispersing agent |
|---|---|---|---|
| 1 | a-1/b-1 (45/55) | 10000 | i |
| 2 | a-2/b-2 (35/65) | 20000 | i |
| 3 | a-1/b-1/c-1 (40/50/10) | 50000 | ii |
| 4 | a-1/b-2/b-3/c-2 (30/50/10/10) | 10000 | ii |
| 5 | a-3/b-2/b-3 (50/45/5) | 8000 | i |
| 6 | a-4/b-1 (45/55) | 10000 | i |

The monomers indicated in Table 1 are as follows.
a-1: polyoxypropylene(n=9) methacrylate
a-2: polyoxypropylene(n=14) methacrylate
a-3: polyoxypropylene(n=5) methacrylate
a-4: 2-Hydroxyethyl(n=1) methacrylate
b-1: 3-Methacryloyloxy-2-hydroxypropyltrimethylammonium chloride
b-2: 2-Methacryloyloxyethyltrimethylammonium chloride
b-3: 2-Dimethylaminoethyl methacrylate
c-1: Styrene
c-2: Butyl acrylate

TABLE 2

| Example | Copolymer salt (composition, wt. %) | Molecular weight | Dispersing agent |
|---|---|---|---|
| 7 | d-1/e-1 (55/45) | 10000 | iii |
| 8 | d-1/e-1/f-1 (50/40/10) | 50000 | iv |
| 9 | d-2/e-1/e-2 (50/20/30) | 10000 | iii |
| 10 | d-3/e-2 (40/60) | 10000 | iii |
| 11 | d-2/e-1/f-2 (55/30/15) | 8000 | iv |
| 12 | d-4/e-2 (50/50) | 10000 | iii |
| 13 | d-1/e-1/f-3 (50/40/10) | 10000 | iv |

The monomers indicated in Table 2 are as follows.
d-1: 3-Methacryloyloxy-2-hydroxypropyltrimethylammonium chloride
d-2: 3-Methacryloylamino-2-hydroxypropyltrimethylammonium chloride
d-3: Vinylbenzyltrimethylammonium chloride
d-4: N-[N',N'-Dimethyl-N'-(2,3-epoxypropyl)ammoniopropyl]maleimide chloride
e-1: Butyl methacrylate
e-2: Styrene
f-1: Polyoxypropylene(n=10) methacrylate
f-2: Polyoxyethylene(n=9) methacrylate
f-3: 2-Hydroxypropyl(n=1) methacrylate

COMPARATIVE EXAMPLES 1 AND 2

Copolymer salts were prepared in the same manner as Example 1 except that the monomer composition was varied as shown in Table 3.

TABLE 3

| Comparative Example | Copolymer salt (composition, wt. %) | Molecular weight |
|---|---|---|
| 1 | Butyl methacrylate/ 2-dimethylaminoethyl methacrylate copolymer (70/30) epichlorohydrin-quaternized salt | 10000 |
| 2 | 2-Ethylhexyl acrylate/ 3-dimethylaminopropyl methacrylamide copolymer (50/50) dimethyl sulfate-quaternized salt | 10000 |

REFERENCE EXAMPLE 1

One-thousand parts of gum rosin was melted at 165° C. and, as a catalyst, 0.95 part of p-toluenesulfonic acid monohydrate was added with stirring. Then, 54 parts of 37% formalin was added at 160°–170° C. over a period of 90 minutes. The mixture was further stirred at the same temperature for one hour to give a formaldehyde-modified rosin. To this modified rosin was added 90 parts of fumaric acid and the reaction was conducted at 200° C. for 3 hours to give a rosin (1) having an acid value of 230 and a softening point of 125° C.

REFERENCE EXAMPLE 2

One-thousand parts of gum rosin was melted at 165° C. and, as a catalyst, 0.95 part of p-toluenesulfonic acid monohydrate was added with stirring. Then, 54 parts of 37% formalin was added at 160°–170° C. over a period of 90 minutes. The mixture was further stirred at the same temperature for 1 hour to give a formaldehyde-modified rosin. To this rosin was added 90 parts of maleic anhydride and the reaction was conducted at 200° C. for 3 hours to provide a rosin (2) having an acid value of 235 and a softening point of 101° C.

REFERENCE EXAMPLE 3

A mixture of 1000 parts of gum rosin and 80 parts of glycerin [equivalent ratio (—OH/—COOH)=0.86] was heated to 250° C. in a nitrogen stream and the esterification reaction was conducted under the same conditions for 12 hours. Then, 90 parts of maleic anhydride was added and the reaction was conducted at a constant temperature of 180° C. The procedure yielded a rosin (3) having an acid value of 90 and a softening point of 210° C.

EXAMPLES 14 THROUGH 30 AND COMPARATIVE EXAMPLE 4

A flask fitted with a stirrer and thermometer was charged with 100 parts of the rosin obtained in one of the Reference Examples and heated to 150° C. for melting. Then, with constant stirring, a 20% aqueous solution of the copolymer salt obtained in one of Examples 1 through 13 was added as a dispersing agent over a period of about 3 minutes. By this time a fair quantity of water had been evaporated off and the temperature had fallen to 93° C. Then, 20 parts of hot water (95° C.) was added, whereupon a creamy water-in-oil emulsion was obtained. While this emulsion was vigorously stirred, 70 parts of hot water (90° C.) was added over a period of 1 minute, whereupon a phase inversion took place to yield an oil-in-water emulsion. This emulsion was externally quenched to a temperature of about 30° C. The rosins and dispersing agents used and their amounts are shown in Table 4.

EXAMPLE 31 AND COMPARATIVE EXAMPLES 5 AND 6

In 100 parts of benzene was dissolved 100 parts of rosin followed by addition of 200 parts of an aqueous solution prepared by diluting a predetermined amount of the dispersing agent with soft water. The resulting mixture was heated to 40° C., preliminarily homogenized with a homo-mixer (5000 rpm×1 min.) and, then, emulsified by two serial passages through a high-pressure piston emulsifier set to a shear pressure of 300 kg/cm² at the same temperature. From the resulting emulsion, the benzene was distilled off under reduced pressure at 40° C. to provide an aqueous emulsion. The rosin and dispersing agents used and their amounts are shown in Table 4.

EXAMPLE 32

An autoclave integrated with a high-pressure piston emulsifier similar to the one described previously was charged with 200 parts of an aqueous solution prepared by diluting 100 parts of rosin with a dispersing agent and soft water and the temperature was increased to 180° C. After one hour of preliminary emulsification at the same temperature, the mixture was transferred to said emulsifier set to a shear pressure of 300 kg/cm². The resulting aqueous emulsion was cooled with a water-cooled condenser. The rosin and dispersing agents used and their amounts are shown in Table 4.

TABLE 4

|  | Rosin (in parts) | Dispersing agent | Amount, in parts (nonvolatile matter) |
|---|---|---|---|
| Example 14 | (1) 100 | Copolymer salt of Example 1 | 5 |
| Example 15 | (1) 100 | Copolymer salt of Example 1 | 10 |
| Example 16 | (1) 100 | Copolymer salt of Example 1 | 20 |
| Example 17 | (1) 100 | Copolymer salt of Example 2 | 10 |
| Example 18 | (1) 100 | Copolymer salt of Example 3 | 10 |
| Example 19 | (1) 100 | Copolymer salt of Example 4 | 10 |
| Example 20 | (1) 100 | Copolymer salt of Example 5 | 10 |
| Example 21 | (1) 100 | Copolymer salt of Example 6 | 10 |
| Example 22 | (1) 100 | Copolymer salt of Example 7 | 10 |
| Example 23 | (1) 100 | Copolymer salt of Example 8 | 10 |
| Example 24 | (1) 100 | Copolymer salt of Example 9 | 10 |
| Example 25 | (1) 100 | Copolymer salt of Example 10 | 10 |
| Example 26 | (1) 100 | Copolymer salt of Example 11 | 10 |
| Example 27 | (1) 100 | Copolymer salt of Example 12 | 10 |
| Example 28 | (1) 100 | Copolymer salt of Example 13 | 10 |
| Example 29 | (2) 100 | Copolymer salt of Example 1 | 10 |
| Example 30 | (3) 100 | Copolymer salt of Example 1 | 10 |
| Example 31 | (1) 100 | Copolymer salt of Example 1 | 10 |
| Example 32 | (1) 100 | Copolymer salt of Example 1 | 10 |
| Comparative Example 4 | (1) 100 | Polyoxyethylene (n = 13) distyryl phenyl ether sulfate Na salt | 5 |
| Comparative Example 5 | (1) 100 | Copolymer salt of Comparative Example 1 | 10 |
| Comparative Example 6 | (1) 100 | Copolymer salt of Comparative Example 2 | 10 |

Then, the mechanical stability and foaming potential of the aqueous emulsions according to Examples 14 through 32 and Comparative Examples 4 through 6 were measured by the following methods.

(1) Mechanical Stability

Fifty grams of each aqueous emulsion was weighed into the sample vessel of a Marlon stability tester (Shinsei Sangyo K. K.) and subjected to a mechanical shear load of 10 kg at 1000 rpm for 5 minutes at a temperature of 25° C. The resulting agglomerate was collected by filtration through a 100-mesh metal screen filter and the mechanical stablity of the emulsion was calculated by means of the following equation.

Mechanical stability (%) = $\frac{\text{Bone-dry weight of agglomerate}}{\text{Bone-dry weight of test emulsion}} \times 100$ (2) Foaming Potential (a)

The test aqueous emulsion was diluted to 5% concentration with deionized water and using the dilution, the foam height (mm) was measured in accordance with JIS K 3362.

(3) Foaming potential (b)

To a 1% aqueous slurry of pulp (L-BKP) were added 5% of the test aqueous emulsion (on a bone-dry basis) and 2.5% of aluminum sulfate, both based on the pulp, to give an aqueous slurry. One liter of this slurry was put in the tester according to JIS K 3362 and the content was circulated (8 l/min.) with a pump for 10 minutes. The circulation was then stopped and the foam height (mm) was measured.

The results of the above tests are shown in Table 5.

TABLE 5

|  | Polymer | Concentration (%) | pH | Particle size (μm) | Mechanical stability (%) | Foam height (mm) (a) | (b) |
| --- | --- | --- | --- | --- | --- | --- | --- |
| Example 14 | (1) | 50.5 | 4.3 | 1> | 0.1 | 51 | 5 |
| Example 15 | (1) | 50.3 | 4.6 | 1> | 0.1 | 53 | 4 |
| Example 16 | (1) | 50.0 | 4.7 | 1> | 0.1 | 55 | 6 |
| Example 17 | (2) | 50.0 | 4.5 | 1> | 0.1 | 50 | 5 |
| Example 18 | (3) | 50.2 | 4.7 | 1> | 0.1 | 52 | 7 |
| Example 19 | (4) | 50.1 | 4.7 | 1> | 0.1 | 48 | 6 |
| Example 20 | (5) | 50.2 | 4.7 | 1> | 0.1 | 55 | 7 |
| Example 21 | (6) | 50.3 | 4.6 | 1> | 0.1 | 52 | 6 |
| Example 22 | (7) | 50.0 | 4.7 | 1> | 0.1 | 53 | 4 |
| Example 23 | (8) | 50.0 | 4.8 | 1> | 0.1 | 47 | 3 |
| Example 24 | (9) | 50.5 | 4.5 | 1> | 0.1 | 56 | 5 |
| Example 25 | (10) | 50.1 | 4.3 | 1> | 0.1 | 55 | 6 |
| Example 26 | (11) | 50.1 | 4.2 | 1> | 0.1 | 52 | 6 |
| Example 27 | (12) | 50.3 | 4.5 | 1> | 0.1 | 55 | 4 |
| Example 28 | (13) | 50.0 | 4.7 | 1> | 0.1 | 54 | 7 |
| Example 29 | (1) | 50.2 | 4.4 | 1> | 0.1 | 53 | 5 |
| Example 30 | (1) | 50.3 | 4.3 | 1> | 0.1 | 50 | 4 |
| Example 31 | (1) | 35.0 | 4.5 | 1> | 0.1 | 52 | 5 |
| Example 32 | (1) | 35.1 | 4.4 | 1> | 0.1 | 53 | 4 |
| Comparative Example 4 |  | 50.3 | 4.8 | 1> | 0.5 | 153 | 60 |
| Comparative Example 5 |  | 35.1 | 4.2 | 1> | 0.8 | 110 | 30 |
| Comparative Example 6 |  | 35.4 | 4.2 | 1> | 0.9 | 105 | 35 |

It is apparent from Table 5 that compared with the known dispersing agents, the dispersant compositions of the invention enable production of aqueous emulsions superior in mechanical stability and with a reduced foaming property.

The sizing effect of the emulsions of the present invention was evaluated in the following field tests (1) through (3).

Field Test 1

To a 1 weight % slurry of pulp (L-BKP, Canadian Standard Freeness 485 ml) was added a predetermined amount of aluminum sulfate and the mixture was stirred for 5 minutes. Then, one of the aqueous emulsions prepared in Examples 14 through 32 and Comparative Examples 4 through 6 was added in a proportion of 0.2 weight % (as nonvolatile matter) based on the pulp and the mixture was further stirred for 5 minutes. Using this pulp slurry, a web was formed at its pH on a TAPPI Standard Sheet Machine. The wet web was then dehydrated under a pressure of 3.5 kg/cm² and dried at 100° C. for 1 minute. The mean weight of the product paper was 61.0 g/m². This paper was conditioned at 20° C. and 65% RH for not less than 24 hours and its stöckigt sizing degree (in seconds) was determined.

The results are shown in Table 6.

TABLE 6

| Amount of aluminum sulfate (%) | 2.0 | 1.0 | 0.5 |
| --- | --- | --- | --- |
| pH | 4.5 | 5.5 | 6.2 |
| Example 14 | 31.6 | 27.0 | 24.9 |

TABLE 6-continued

| Amount of aluminum sulfate (%) | 2.0 | 1.0 | 0.5 |
| --- | --- | --- | --- |
| Example 15 | 32.1 | 27.5 | 25.3 |
| Example 16 | 31.8 | 26.3 | 24.8 |
| Example 17 | 32.4 | 27.5 | 23.3 |
| Example 18 | 30.6 | 26.1 | 24.1 |
| Example 19 | 32.5 | 27.0 | 23.8 |
| Example 20 | 33.0 | 26.8 | 23.5 |
| Example 21 | 32.7 | 25.9 | 22.7 |
| Example 22 | 29.4 | 24.3 | 20.0 |
| Example 23 | 32.1 | 27.4 | 24.6 |
| Example 24 | 28.6 | 24.5 | 20.5 |
| Example 25 | 29.5 | 24.1 | 19.8 |
| Example 26 | 32.5 | 28.3 | 24.5 |
| Example 27 | 29.3 | 24.4 | 20.6 |
| Example 28 | 30.1 | 26.2 | 23.1 |
| Example 29 | 31.2 | 27.5 | 24.8 |
| Example 30 | 32.6 | 27.9 | 23.6 |
| Example 31 | 31.4 | 27.1 | 24.5 |
| Example 32 | 32.3 | 26.9 | 23.9 |
| Comparative Example 4 | 19.6 | 14.1 | 3.0 |
| Comparative Example 5 | 25.6 | 19.3 | 11.4 |
| Comparative Example 6 | 24.3 | 20.1 | 12.3 |

Field Test 2

To a 1 weight % slurry of pulp (L-BKP, Canadian Standard Freeness 450 ml) were added 2 weight % of calcium carbonate and 0.5 weight % of aluminum sulfate, both based on the pulp, and the mixture was stirred for 5 minutes. Then, 0.2 weight % (as nonvolatile matter), also based on the pulp, of one of the aqueous emulsions prepared in Examples 14 through 32 and Comparative Examples 4 through 6 was added and the whole mixture was further stirred for 5 minutes. Using this pulp slurry, a web was formed at pH 7.2 on a TAPPI Standard Sheet Machine. The resulting web was dehydrated under a pressure of 3.5 kg/cm² and dried at 100° C. for 1 minute. The mean weight of the product paper was 60.5 g/m². The resulting paper was conditioned at 20° C. and 65% RH for not less than 24 hours and its Stöckigt sizing degree (in seconds) was determined. The results are shown in Table 7.

Field Test 3

To a 1 weight % slurry of pulp (a waste magazine paper containing 4.5 weight % of calcium carbonate, Canadian Standard Freeness 380 ml) was added 0.5 weight % as nonvolatile matter, of one of the aqueous emulsions prepared in Examples 14 through 32 and Comparative Examples 4 through 6 and the mixture was stirred for 5 minutes. Then, 0.5 weight % of aluminum sulfate was added and the slurry was further stirred for 5 minutes. Using this pulp slurry, a web was formed at pH 6.9 on a TAPPI Standard Sheet Machine. The resulting web was dehydrated under a pressure of 3.5 kg/cm$^2$ and dried at 100° C. for 1 minute. The mean weight of the resulting paper was 60.5 g/m$^2$. This paper was conditioned at 20° C. and 65% RH for not less than 24 hours and its stöckigt sizing degree was determined.

The results are shown in Table 7.

TABLE 7

|  | Field Test 2 | Field Test 3 |
|---|---|---|
| Example 14 | 26.4 | 15.9 |
| Example 15 | 27.3 | 16.3 |
| Example 16 | 26.1 | 15.5 |
| Example 17 | 27.0 | 16.4 |
| Example 18 | 26.3 | 16.0 |
| Example 19 | 27.5 | 15.8 |
| Example 20 | 26.9 | 16.2 |
| Example 21 | 24.4 | 15.6 |
| Example 22 | 23.1 | 12.1 |
| Example 23 | 27.6 | 16.4 |
| Example 24 | 22.3 | 11.9 |
| Example 25 | 23.5 | 12.5 |
| Example 26 | 26.5 | 15.8 |
| Example 27 | 24.1 | 12.9 |
| Example 28 | 25.7 | 14.7 |
| Example 29 | 27.5 | 16.5 |
| Example 30 | 26.9 | 15.9 |
| Example 31 | 26.5 | 16.3 |
| Example 32 | 27.1 | 16.2 |
| Comparative Example 4 | 1.5 | 0 |
| Comparative Example 5 | 12.0 | 5.5 |
| Comparative Example 6 | 11.5 | 5.0 |

It is apparent from Tables 6 and 7 that the emulsions of the invention invariably exhibit excellent sizing effects under a broad range of papermaking conditions.

We claim:

1. A dispersant composition suitable for the production of an aqueous rosin emulsion which comprises as an active ingredient a water-soluble copolymer salt comprising (1) a monomer unit a of the general formula

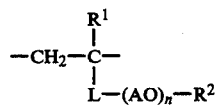

(I)

wherein R$^1$ means a hydrogen atom or a methyl group; L means —COO— or —CH$_2$O—; A means an alkylene group of 2 to 4 carbon atoms; n means a whole number of not less than 1; R$^2$ means an alkyl group of 1 to 24 carbon atoms or an aralkyl group and (2) a tertiary and/or quaternary nitrogen-containing monomer unit b.

2. A dispersant composition according to claim 1 which contains said monomer unit a in a proportion of 20 to 80 weight % and said monomer unit b in a proportion of to 80 weight %.

3. A dispersant composition according to claim 1 wherein said monomer unit b is at least one member selected from the group consisting of tertiary nitrogen-containing monomer units of the general formula

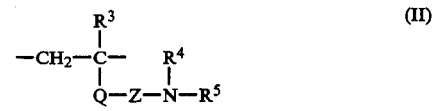

(II)

wherein R$^3$ means a hydrogen atom or a methyl group; Q means —COO—, —CONH— or —CH$_2$O—; R$^4$ means an alkyl group of 1 to 4 carbon atoms or an aralkyl group; R$^5$ means an alkyl group of 1 to 4 carbon atoms, an aralkyl group or a group of the general formula

(III)

wherein Y means an alkylene group of 1 to 4 carbon atoms or a hydroxyalkylene group of 2 to 4 carbon atoms; R$^4$ is as defined hereabove; Z means an alkylene group of 1 to 4 carbon atoms, a hydroxyalkylene group of 2 to 4 carbon atoms or a phenylene group, units of tertiary nitrogen-containing monomer having a vinylbenzyl group, units of tertiary nitrogen-containing monomer having a maleimide group, and monomer units of quaternarizate of these tertiary nitrogen-containing monomers.

4. A dispersant composition according to claim 1 wherein the water-soluble copolymer salt has a weight average molecular weight of 1000 to 500000.

5. A dispersant composition according to claim 1, wherein the water-soluble copolymer salt further comprises (3) a monomer unit c which is copolymerizable with said monomer units a and b.

6. A dispersant composition according to claim 5 which contains said monomer unit a in a proportion of 20 to 80 weight %, said monomer unit b in a proportion of 20 to 80 weight % and said monomer unit c in a proportion of not more than 50 weight %.

7. A dispersant composition according to claim 5 wherein said monomer unit b is at least one member selected from the group consisting of tertiary nitrogen-containing monomer units of the general formula

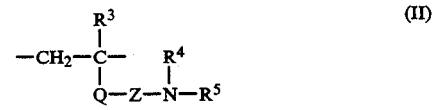

(II)

wherein R$^3$ means a hydrogen atom or a methyl group; Q means —COO—, —CONH— or —CH$_2$—; R$^4$ means an alkyl group of 1 to 4 carbon atoms or an aralkyl group; R$^5$ means an alkyl group of 1 to 4 carbon atoms, an aralkyl group or a group of the general formula

(III)

wherein Y means an alkylene group of 1 to 4 carbon atoms or a hydroxyalkylene group of 2 to 4 carbon atoms; $R^4$ is as defined hereabove; Z means an alkylene group of 1 to 4 carbon atoms, a hydroxyalkylene group of 2 to 4 carbon atoms or a phenylene group, units of tertiary nitrogen-containing monomer having a vinylbenzyl group, units of tertiary nitrogen-containing monomer having a maleimide group, and monomer units of quaternarizate of these tertiary nitrogen-containing monomers.

8. A dispersant composition according to claim 5 wherein said monomer unit c is at least one member selected from the group consisting of hydrocarbon monomer units and (meth)acrylate ester monomer units.

9. A dispersant composition according to claim 5 wherein said water-soluble copolymer salt has a weight average molecular weight of 1000 to 500000.

10. A dispersant composition suitable for the production of an aqueous rosin emulsion which contains as an active ingredient a water-soluble copolymer salt comprising (4) at least one monomer unit d selected from the group consisting of monomer having a hydroxyl group of the formula

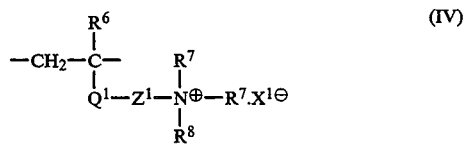
(IV)

wherein $R^6$ means a hydrogen atom or a methyl group; $Q^1$ means —COO—, —COHN— or $CH_2O$—;
$R^7$ means an alkyl group of 1 to 4 carbon atoms or an aralkyl group;
$R^8$ means an alkyl group of 1 to 4 carbon atoms, an aralkyl group or a group of the formula

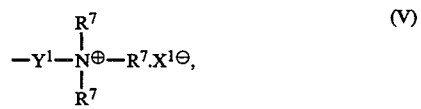
(V)

wherein $Y^1$ means an alkylene group of 1 to 4 carbon atoms or a hydroxyalkylene group of 2 to 4 carbon atoms;
$X^1$ means a salt-forming anion;
$Z^1$ means an alkylene group of 1 to 4 carbon atoms, a hydroxyalkylene group of 1 to 4 carbon atoms or a phenylene group;
provided, however, that at least either $Y^1$ or $Z^1$ means a hydroxyalkylene group of 2 to 4 carbon atoms, units of quaternary nitrogen-containing monomer having a vinylbenzyl group and units of quaternary nitrogen-containing monomer having a maleimide group and (5) at least one monomer unit e selected from the group consisting of hydrocarbon monomer units and (meth)acrylate ester monomer units.

11. A dispersant composition according to claim 10 which contains said monomer unit d in proportion of 20 to 80 weight % and said monomer unit e in a proportion of 20 to 80 weight %.

12. A dispersant composition according to claim 10 wherein the water-soluble copolymer salt has a weight average molecular weight of 1000 to 500000.

13. A dispersant composition according to claim 10 wherein the water-soluble copolymer salt further comprises
(6) a monomer unit f which is copolymerizable with said monomer units d and e.

14. A dispersant composition according to claim 13 which contains said monomer unit d in a proportion of 20 to 80 weight %, said monomer unit e in a proportion of 20 to 80 weight %, and said monomer unit f in a proportion of not more than 20 weight %.

15. A dispersant composition according to claim 13 wherein the water-soluble copolymer salt has a weight average molecular weight of 1000 to 500000.

16. An aqueous rosin emulsion containing 1 to 30 weight parts of a water-soluble copolymer salt per 100 weight parts of rosin material, the copolymer salt comprising
(1) a monomer unit a of the formula

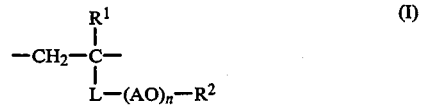
(I)

wherein $R^1$ means a hydrogen atom or a methyl group; L means —COO— or —$CH_2O$—; A means an alkylene group of 2 to 4 carbon atoms; n means a whole number of not less than 1; $R^2$ means an alkyl group of 1 to 24 carbon atoms or an aralkyl group and (2) a tertiary and/or quaternary nitrogen-containing monomer unit b.

17. An aqueous rosin emulsion containing 1 to 30 weight parts of a water-soluble copolymer salt per 100 weight parts of rosin material, the copolymer salt comprising (4) at least one monomer unit d selected from the group consisting of units of quaternary nitrogen-containing monomer having a hydroxyl group, units of quaternary nitrogen-containing monomer having a vinyl-benzyl group and units of quaternary nitrogen-containing monomer having a maleimide group and (5) at least one monomer unit e selected from the group consisting of hydrocarbon monomer units and (meth)acrylate ester monomer units.

* * * * *